US006812769B1

United States Patent
Yang et al.

(10) Patent No.: US 6,812,769 B1
(45) Date of Patent: Nov. 2, 2004

(54) SWITCHED CHARGE MULTIPLIER-DIVIDER

(75) Inventors: Ta-yung Yang, Milipitas, CA (US); Jenn-yu G. Lin, Taipei (TW); Rui-Hong Lu, Chia-I (TW)

(73) Assignee: System Chemical Corp., Taipei Hsien (TW)

( * ) Notice: Subject to any disclaimer, the term of this patent is extended or adjusted under 35 U.S.C. 154(b) by 0 days.

(21) Appl. No.: 10/640,424

(22) Filed: Aug. 12, 2003

(51) Int. Cl.$^7$ ................................................ G06G 7/12
(52) U.S. Cl. .................. 327/355; 327/356; 327/360
(58) Field of Search ............................. 327/355, 356, 327/358–360, 131, 133, 134, 172, 90, 91, 94; 708/835, 843

(56) References Cited

U.S. PATENT DOCUMENTS 3,681,586 A * 8/1972 Kitaura ..................... 327/356
3,731,206 A * 5/1973 Veale ........................ 327/172
5,585,753 A * 12/1996 Ishiwata et al. ........... 327/131

* cited by examiner

*Primary Examiner*—Long Nguyen
(74) *Attorney, Agent, or Firm*—J.C. Patents

(57) ABSTRACT

The switched charge multiplier-divider according to the present invention is constructed of CMOS devices. Capacitor charge theory is employed to implement the circuit of the switched charge multiplier-divider. The switched charge multiplier-divider includes an output capacitor and controls the voltage across the output capacitor, so that it is proportional to the product of the charge current and the charge-time interval. The switched charge multiplier-divider is ideal for use in the power factor correction (PFC) of switching mode power supplies. Potentially, it can also be applied to automatic gain control (AGC) circuits.

20 Claims, 8 Drawing Sheets

SWITCHED CHARGE MULTIPLIER-DIVIDER

BACKGROUND OF THE INVENTION

1. Field of the Invention

The present invention generally relates to the art of electronics and more particularly relates to an analog multiplier-divider.

2. Description of the Prior Art

There are many uses of analog multiplier-dividers in modem electronics. Multiplier-dividers produce an output signal that is proportional to a ratio of two or more input signals. The input and output signals can either be voltages or currents.

One common use for multiplier-dividers is in power factor correction (PFC) circuits. PFC circuits commonly use multiplier-dividers to generate a control signal based on an input current, a feedback signal, and an input voltage. Other uses of multiplier-divider circuits include but are not limited to automatic gain control (AGC) circuits.

There are many known ways of constructing analog multiplier-dividers, such as logarithmic amplifiers and anti-log amplifiers. The implementation of a logarithmic amplifier normally uses the p-n junction volt-ampere characteristic; it is given by $$I_D = I_0 \times [\exp(V_D/\eta V_T) - 1] \quad (1)$$

where $I_0$ is the reverse saturation current; $V_D$ is the forward bias voltage; $\eta$ is the constant; $V_T = T/11,600$ and T is the temperature ° K. Since the output current $I_D$ is the exponential function of the forward bias voltage $V_D$, the linear operating region is small. The book "Analog Integrated Circuit Design" by David A. Johns and Ken Martin (1997, p 366–367) teaches another known analog multiplier-divider. This particular multiplier-divider is also implemented by using p-n junction devices. As FIG. 1 shows, it is referred to as a four-quadrant multiplier.

The prior-art multiplier-divider shown in FIG. 1 is built using bipolar transistor devices. It supplies an output current with the amplitude that is proportional to the product of a first input current and a current ratio. The current ratio is equal to the amplitude of a second input current divided by the amplitude of a bias current.

Many other known prior-art multiplier-dividers are all based on the principles as the prior-art multiplier-divider shown in FIG. 1. Those prior-art multiplier-dividers share the same disadvantages because they are built using bipolar transistor devices.

One disadvantage of the prior-art multiplier-divider shown in FIG. 1 is its high manufacture cost. For many present-day applications, such as PFC circuits, integrated circuits manufacture using bipolar process are not suitable because bipolar devices still occupy lots of die space and increase the cost.

Another disadvantage of the prior-art multiplier-divider shown in FIG. 1 is that the output of the circuit varies significantly with temperature. Referring to equation (1), it is obviously that bipolar devices have high temperature coefficients. Thus, the output of the circuit is highly susceptible to temperature changes.

Another disadvantage of the prior-art multiplier-divider shown in FIG. 1 is high power consumption. The prior-art multiplier-divider requires a constant non-zero biasing current to operate bipolar transistors in linear mode. This results in significant power consumption.

Another disadvantage of the prior-art multiplier-divider shown in FIG. 1 is poor noise immunity. This is because the prior-art multiplier-divider uses high-gain bipolar transistor devices. With such devices, even relatively small input signal distortion can result in significant output signal distortion.

Another disadvantage of the prior-art multiplier-divider of FIG. 1 is that it has a narrow input range, limited to the linear operating region of bipolar transistors. Outside this narrow input signal range, the multiplier-divider shown in FIG. 1 is highly susceptible to distortion.

Therefore, it is needed to improve the drawbacks of the prior-art multiplier-dividers. In particular, an improved multiplier-divider that has a smaller die size while being suitable for a wider range of operating temperatures is absolutely needed.

SUMMARY OF THE INVENTION

According to one aspect of the present invention, the multiplier-divider of the present invention produces an output signal in response to three input signals. The output signal is proportional to the product of a first input signal and a second input signal divided by a third input signal.

A general objective of the present invention is to provide a general-purpose multiplier-divider. It is a further objective of the present invention to provide a multiplier-divider that is suitable to apply in a power factor correction (PFC) circuit of a switch mode power supply.

Another objective of the present invention is to provide a multiplier-divider that is manufactured in CMOS process. The multiplier-divider according to the present invention exclusively uses MOSFET-based devices. Therefore, the multiplier-divider according to the present invention can be manufactured at a significantly reduced die-size level, and at a lower cost than the prior-art multiplier-divider.

Another objective of the present invention is to provide a multiplier-divider having a characteristic equation that is substantially independent of temperature, compared to prior-art multiplier-dividers.

Another objective of the present invention is to provide a multiplier-divider with reduced power consumption. The multiplier-divider according to the present invention does not require a constant biasing current.

Another objective of the present invention is to provide a multiplier-divider with improved noise immunity. The accuracy of the output signal of the multiplier-divider according to the present invention is not significantly affected by small noise components from the input signals.

Briefly, the present invention relates to a switched charge multiplier-divider. The switched charge multiplier-divider is built according to the principle of capacitor charge theory. The voltage across the capacitor is proportional to the product of the charge current and the charge time interval, and is divided by the capacitance of the capacitor. By using a modulated charge current and a programmable charge time to switch the capacitor, the voltage across the capacitor can be controlled. This capacitor voltage is the output voltage of the switched charge multiplier-divider.

The switched charge multiplier-divider according to the present invention can perform signal multiplication and division. Use of the capacitor charge technique enables the implementation of a multiplier-divider with reduced power consumption, improved noise immunity, a wider operating range, and a lower temperature coefficient.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
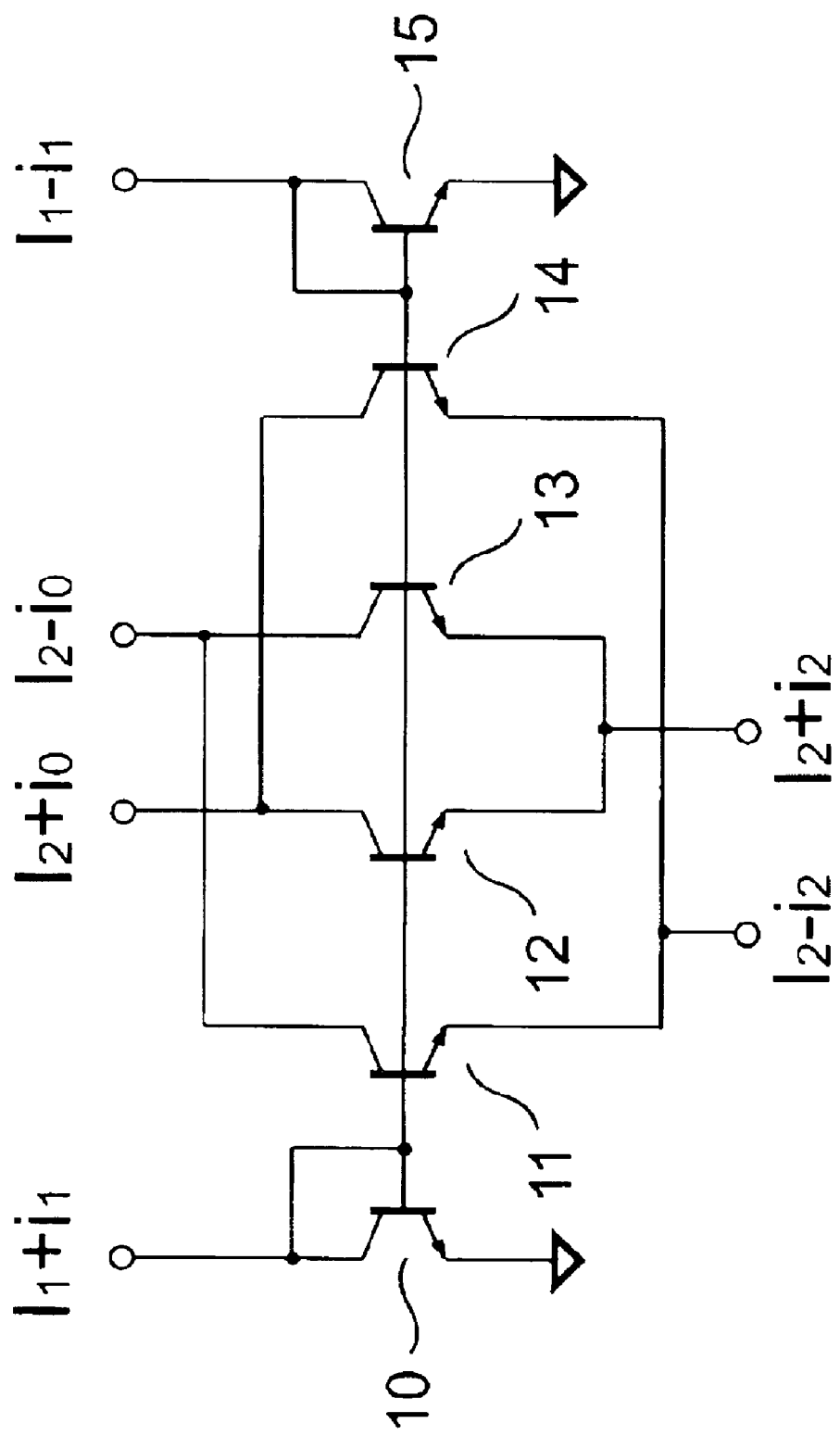
FIG. 1 shows a conventional multiplier-divider.

Referring now to the drawings wherein the contents are for purposes of illustrating preferred embodiments of the invention only and not for purposes of limiting same.

FIG. 1 shows a prior-art multiplier-divider. The prior-art multiplier-divider is constructed of an array of six bipolar transistors 10, 11, 12, 13, 14 and 15. A base of each of the transistors 10, 11, 12, 13, 14 and 15 are all tied together.

A collector of the transistor 10 is connected to the base of the transistor 10. An emitter of the transistor 10 is connected to the ground reference. The collector of the transistor 10 is connected to a first positive input terminal. A collector of the transistor 11 is connected to a negative output terminal. A collector of the transistor 12 is connected to a positive output terminal. A collector of the transistor 13 is connected to the negative output terminal. An emitter of the transistor 12 and an emitter of the transistor 13 are connected to a second positive input terminal. A collector of the transistor 14 is connected to the positive output terminal. An emitter of the transistor 11 and an emitter of the transistor 14 are connected to a second negative input terminal. A collector of the transistor 15 is connected to a first negative input terminal. The collector of the transistor 15 is connected to the base of the transistor 15. An emitter of the transistor 15 is connected to the ground reference. Operation of this circuit will be well known to those skilled in the art and does not need to be discussed in further detail herein.

As discussed above, one major drawback of this prior-art multiplier-divider is that it is constructed of bipolar transistor devices. This results in a large die-size and introduces high temperature dependence into the characteristic of the prior-art multiplier-divider.

Figure 2:
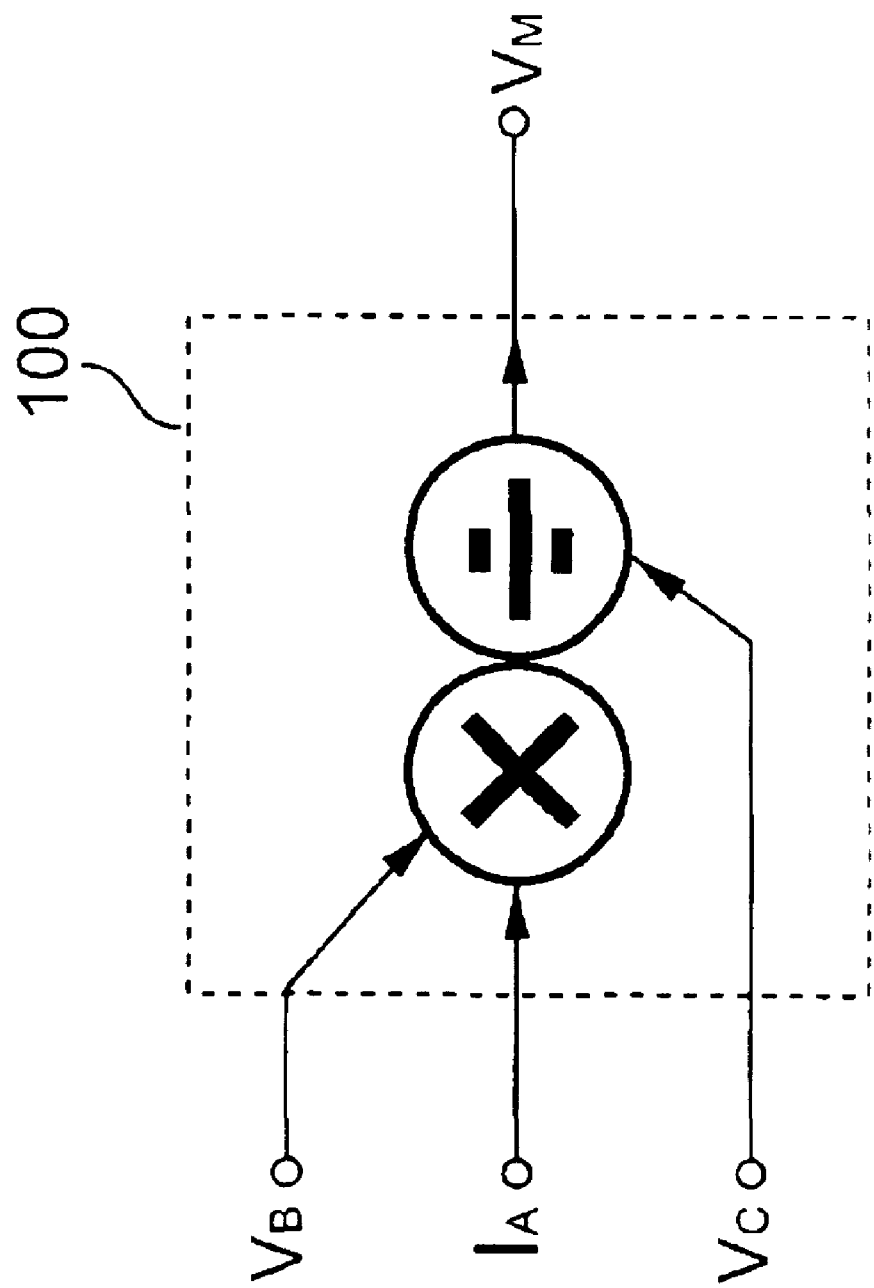
FIG. 2 shows a block diagram of a switched charge multiplier-divider according to a preferred embodiment of the present invention.

To overcome these problems, the present invention proposes a switched charge multiplier-divider 100 constructed of MOSFET devices. FIG. 2 shows a block diagram of the switched charge multiplier-divider 100 according to the present invention. The switched charge multiplier-divider 100 has a first multiplier input terminal for receiving a first multiplier input signal $V_B$, a second multiplier input terminal for receiving a second multiplier input signal $I_A$, and a divisor input terminal for receiving a divisor input signal $V_C$. The switched charge multiplier-divider 100 also has an output terminal for generating an output voltage signal $V_M$. The magnitude of the output voltage signal $V_M$ is proportional to the magnitude of the first multiplier input signal $V_B$ multiplied by the magnitude of the second multiplier input signal $I_A$, divided by the divisor input signal $V_C$. The first multiplier input signal $V_B$ and the divisor input signal $V_C$ are voltage signals and the second multiplier input signal $I_A$ is a current signal. The output of the switched charge multiplier-divider 100 can be expressed as, $$V_M \propto k \times \left(\frac{I_A \times V_B}{V_C}\right) \qquad (2)$$

where k is an constant.

However, it is to be understood that voltage input/output could be converted to current input/output, and that current input/output could be converted to voltage input/output without departing from the spirit of the invention. Methods of converting a current to a voltage, and vice-versa, are well known to those skilled in the art.

The switched charge multiplier-divider 100 is implemented according to the principle of capacitor charge theory. An important equation describing the behavior of capacitors is:

$$Q = C \times V = I \times T \qquad (3)$$

where Q is the charge, C is the capacitance of the capacitor, V is the voltage across the capacitor, I is the charge current, and T is the charge time.

According to equation (3), a programmable charge time $T_1$ can be expressed as, $$T_1 = \frac{V_B \times C_1}{I_1} \qquad (4)$$

where a charge current $I_1$ charges a capacitor that has a capacitance $C_1$.

$$I_1 = \frac{V_C}{R_1}$$

Then equation (4) can also be shown as, $$T_1 = R_1 \times C_1 \times \frac{V_B}{V_C} \qquad (5)$$

Charging a capacitor with a capacitance $C_2$ with the second multiplier input signal $I_A$ for the duration of the programmable charge time $T_1$ will produce the output voltage signal $V_M$ at the output of the multiplier-divider 100, $$V_M = \frac{I_A}{C_2} \times T_1 = \frac{C_1}{C_2} \times R_1 \times \frac{I_A \times V_B}{V_C} = k \times \frac{I_A \times V_B}{V_C}$$

where $R_1$ is the resistance of the resistor, $C_1$ and $C_2$ are the capacitances of the capacitors, k is a constant equal to $R_1 \times (C_1/C_2)$.

Therefore, a basic model of the multiplier-divider is built as described above.

Figure 3:
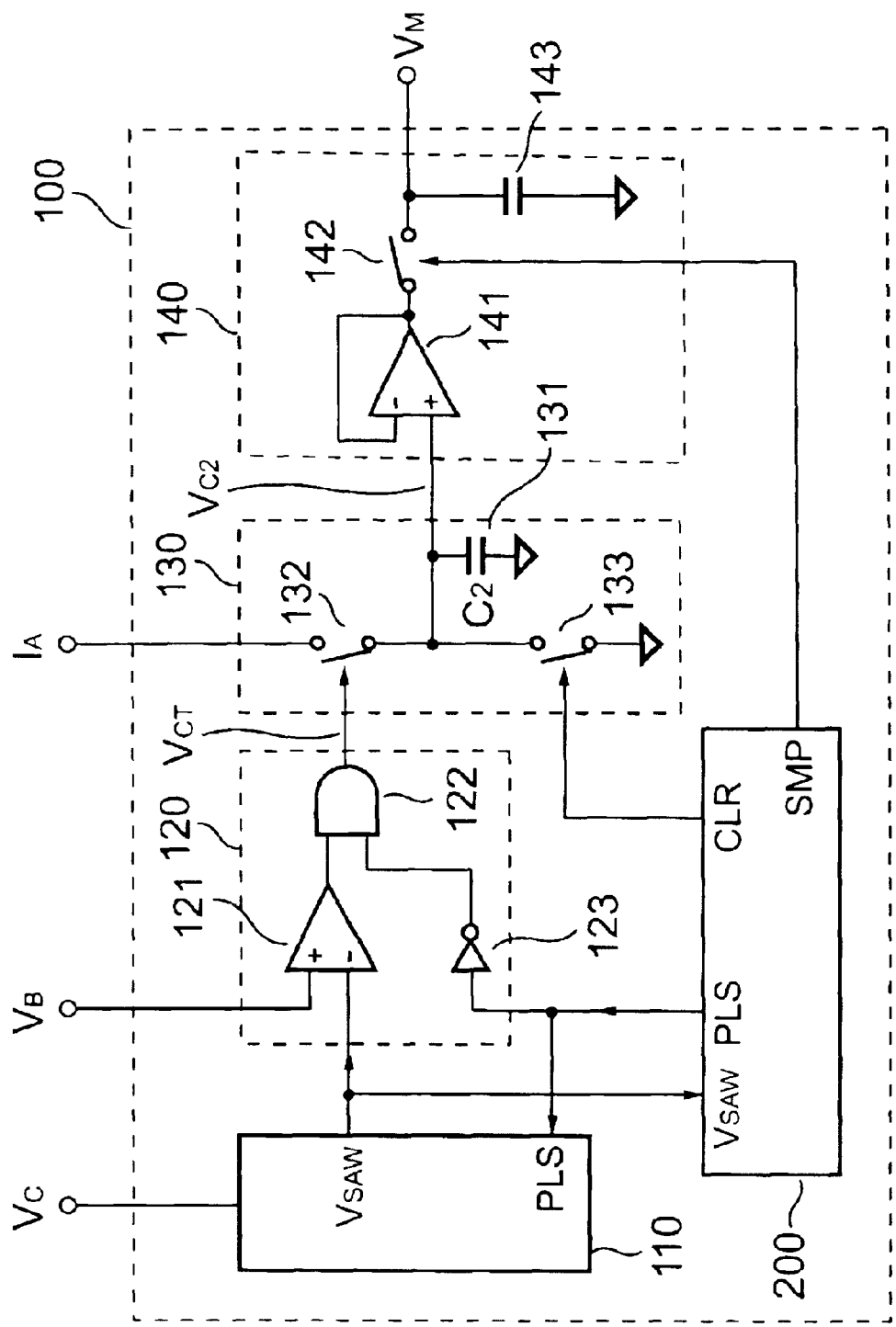
FIG. 3 shows the switched charge multiplier-divider according to a preferred embodiment of the present invention.

FIG. 3 shows a preferred embodiment of the switched charge multiplier-divider 100 according to the present invention. The switched charge multiplier-divider 100 includes a sawtooth signal generator 110, a charge-time control circuit 120, a linear charging circuit 130, a sample-hold circuit 140, and a pulse generator 200. The sawtooth signal generator 110 generates a sawtooth signal $V_{SAW}$ that has a fixed period. The maximum voltage and the slew rate of the sawtooth signal $V_{SAW}$ are proportional to the magnitude of the divisor input signal $V_C$. The sawtooth signal $V_{SAW}$ is compared with the first multiplier input signal $V_B$ to generate a charge-time signal $V_{CT}$. The charge-time signal $V_{CT}$ determines the programmable charge time $T_1$ of the charge-time control circuit 120. The programmable charge time $T_1$ is thus controlled by the divisor input signal $V_C$ and the first multiplier input signal $V_B$. The linear charging circuit 130 includes a charge circuit that is charged by the second multiplier input signal $I_A$. The charge time of the linear charging circuit 130 is determined by the programmable charge time $T_1$. The sample-hold circuit 140 samples an output-stage signal $V_{C2}$ of the linear charging circuit 130 and holds the output voltage signal $V_M$ at the output terminal of the switched charge multiplier-divider 100.

Figure 8:
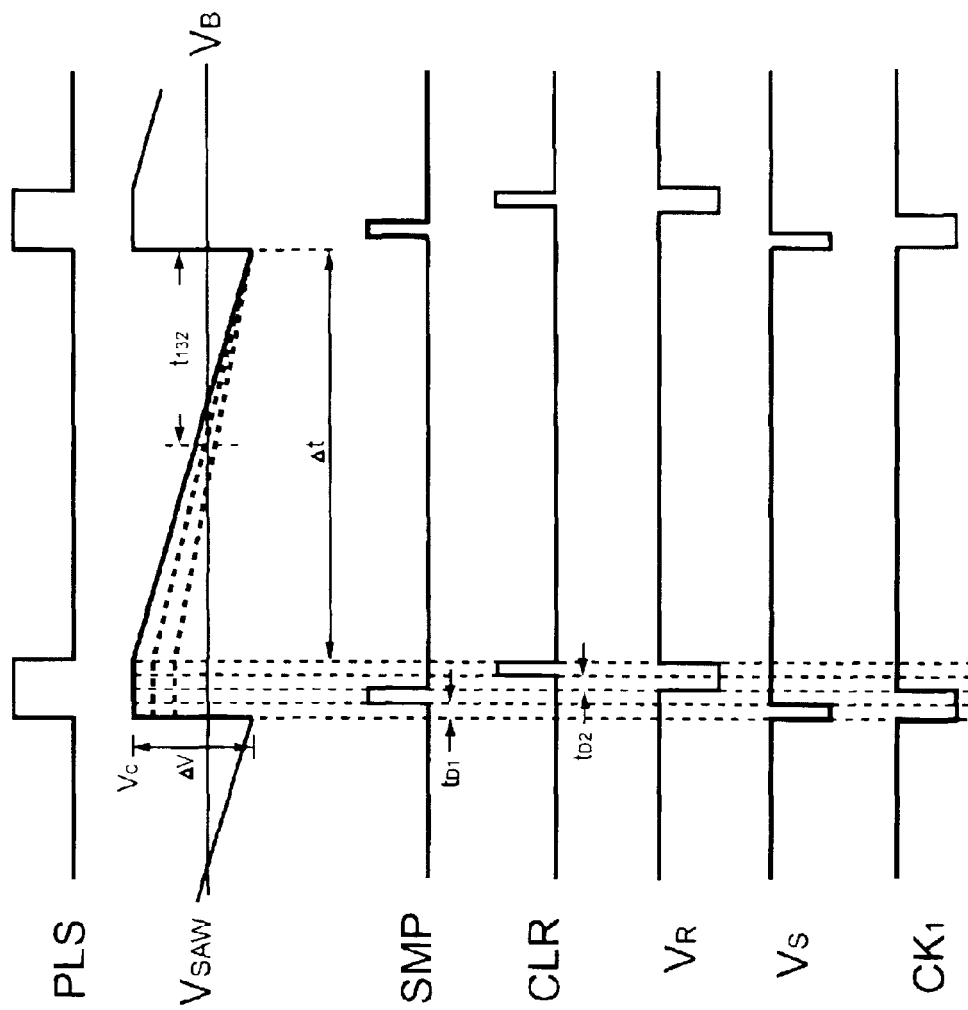
FIG. 8 shows a timing diagram of the pulse generator of the switched charge multiplier-divider according to a preferred embodiment of the present invention.

The pulse generator 200 produces control signals including a pulse signal PLS, a sampling signal SMP and a clear signal CLR. As FIG. 8 shows, the sampling signal SMP follows the pulse signal PLS after a delay time $t_{D1}$. The clear signal CLR follows the sampling signal SMP after a delay time $t_{D2}$.

Figure 6:
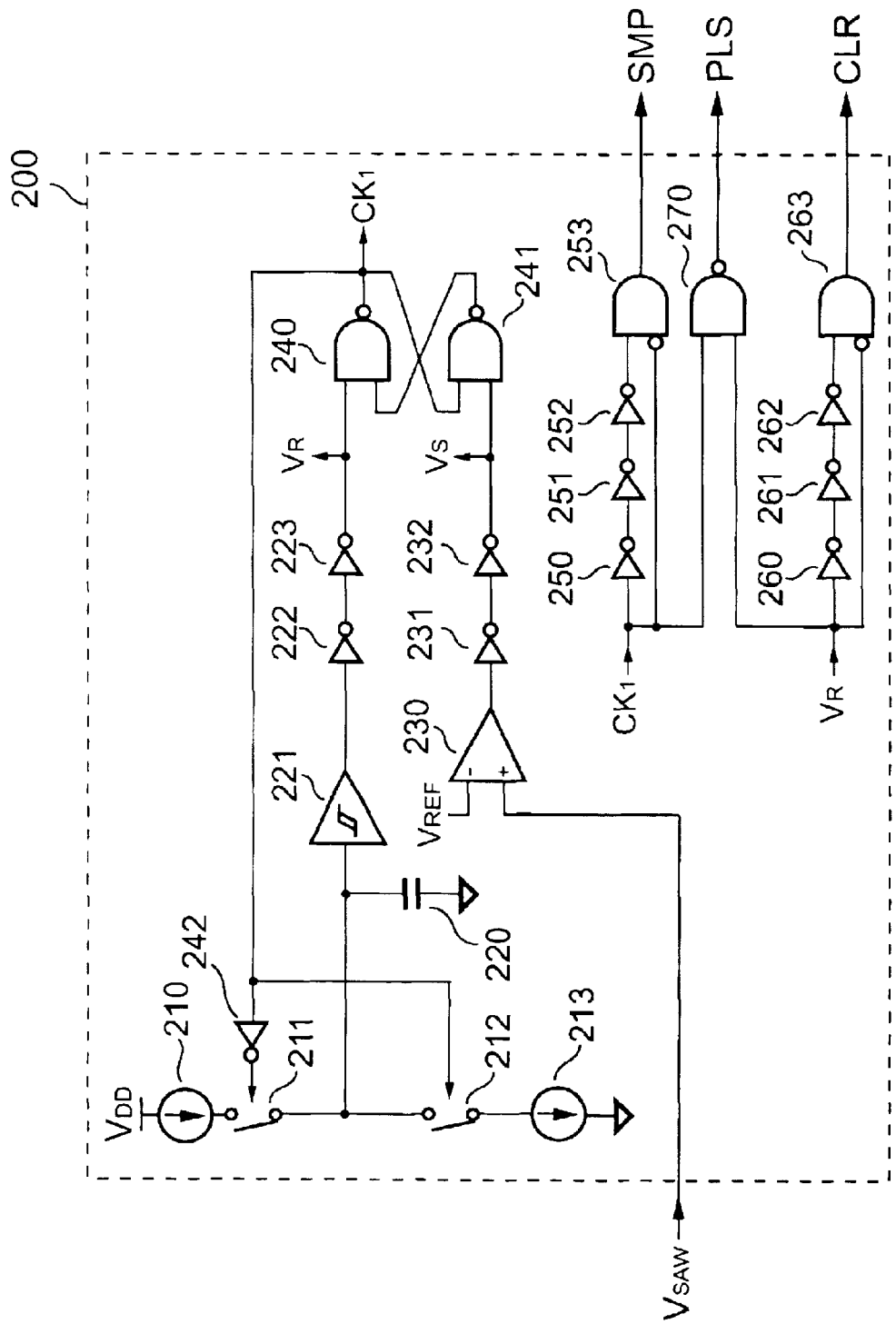
FIG. 6 shows a pulse generator of the switched charge multiplier-divider according to a preferred embodiment of the present invention.
Figure 7:
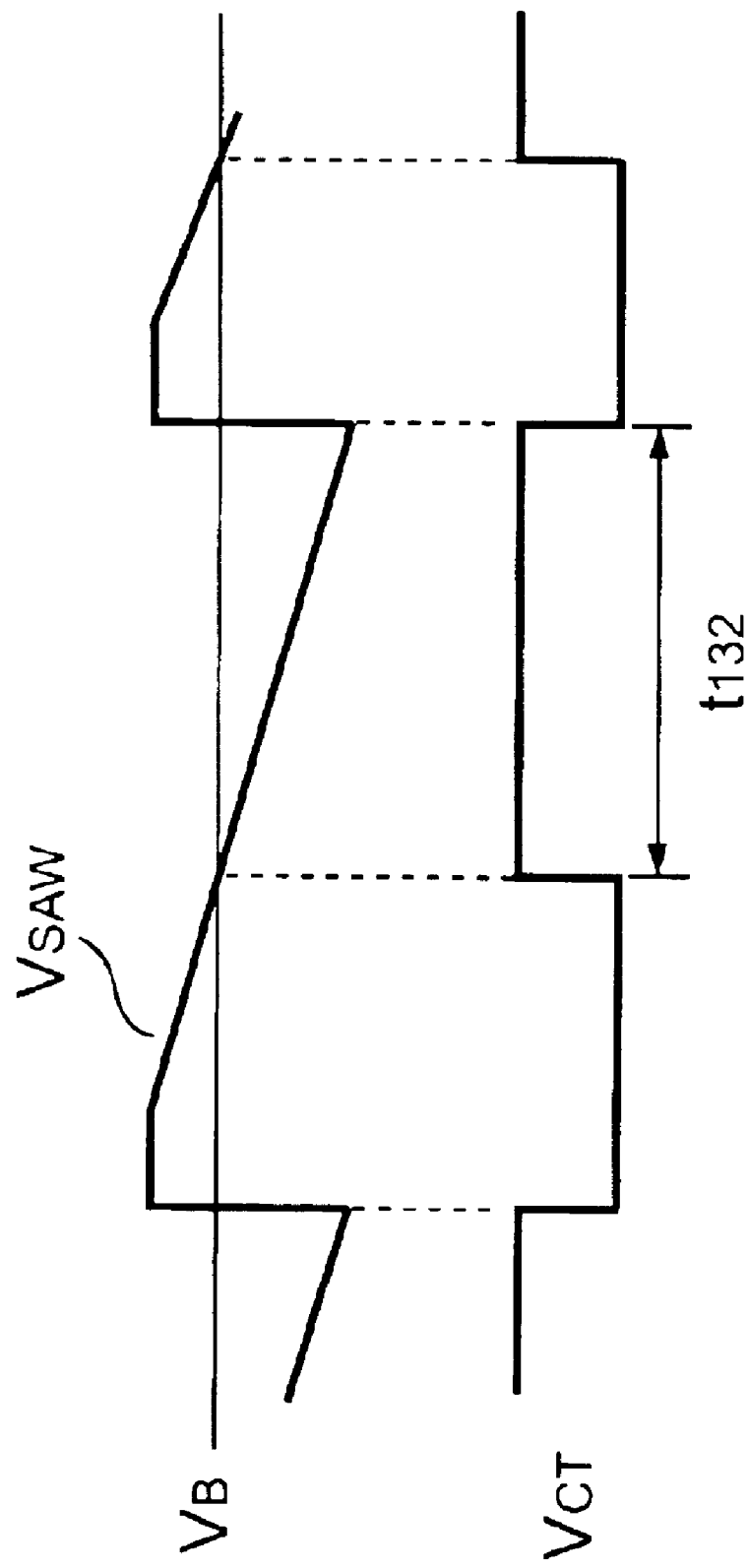
FIG. 7 shows a timing diagram of the sawtooth signal generator of the switched charge multiplier-divider according to a preferred embodiment of the present invention.

FIG. 6 shows the pulse generator 200 according to a preferred embodiment of the present invention. The pulse generator 200 includes a current source 210, a switch 211, a switch 212, and a current sink 213. The pulse generator 200 further includes a capacitor 220, a hysteresis comparator 221, a NOT-gate 222, a NOT-gate 223. The pulse generator 200 further includes a comparator 230, a NOT-gate 231, a NOT-gate 232, a NAND-gate 240, a NAND-gate 241, and a NOT-gate 242. The pulse generator 200 further includes a NOT-gate 250, a NOT-gate 251, a NOT-gate 252, and an AND-gate 253. The pulse generator 200 further includes a NOT-gate 260, a NOT-gate 261, a NOT-gate 262, an AND-gate 263, and a NAND-gate 270.

An input of the current source 210 is connected to a voltage source $V_{DD}$. The switch 211 is connected between an output of the current source 210 and an input junction. The switch 212 is connected between the input junction and an input of the current sink 213. An output of the current sink 213 is connected to the ground reference. An input of the hysteresis comparator 221 is connected to the input junction. The capacitor 220 is connected between the input of the hysteresis comparator 221 and the ground reference. An output of the hysteresis comparator 221 is connected to an input of the NOT-gate 222. An output of the NOT-gate 222 is connected to an input of the NOT-gate 223. A voltage terminal $V_R$ is connected to an output of the NOT-gate 223.

A positive input of the comparator 230 is connected to an output terminal of the sawtooth signal generator 110 for receiving the sawtooth signal $V_{SAW}$. A negative input of the comparator 230 is supplied with a reference voltage $V_{REF}$. An output of the comparator 230 is connected to an input of the NOT-gate 231. An output of the NOT-gate 231 is connected to an input of the NOT-gate 232. An output of the NOT-gate 232 is connected to a voltage terminal $V_S$.

A first input of the NAND-gate 240 is connected to the output of the NOT-gate 223. A second input of the NAND-gate 240 is connected to an output of the NAND-gate 241. A first input of the NAND-gate 241 is connected to an output of the NAND-gate 240. A second input of the NAND-gate 241 is connected to the output of the NOT-gate 232. The output of the NAND-gate 240 outputs a clock signal $CK_1$, which is supplied to a control terminal of the switch 212. The clock signal $CK_1$ is also supplied to a control terminal of the switch 211 via the NOT-gate 242.

An input of the NOT-gate 250 is connected to the output of the NAND-gate 240 for receiving the clock signal $CK_1$. An input of the NOT-gate 251 is connected to an output of the NOT-gate 250. An input of the NOT-gate 252 is connected to an output of the NOT-gate 251. An output of the NOT-gate 252 is connected to an input of the AND-gate 253. An inverted input of the AND-gate 253 is connected to the output of the NAND-gate 240. The AND-gate 253 of the pulse generator 200 outputs the sampling signal SMP.

An input of the NOT-gate 260 is connected to the voltage terminal $V_R$. An input of the NOT-gate 261 is connected to an output of the NOT-gate 260. An input of the NOT-gate 262 is connected to an output of the NOT-gate 261. An output of the NOT-gate 262 is connected to an input of the AND-gate 263. An inverted input of the AND-gate 263 is connected to the voltage terminal $V_R$. The AND-gate 263 of the pulse generator 200 outputs the clear signal CLR.

A first input of the NAND-gate 270 is connected to the output of the NAND-gate 240. A second input of the NAND-gate 270 is connected to the voltage terminal $V_R$. The output of the NAND-gate 270 of the pulse generator 200 outputs the pulse signal PLS.

FIG. 8 is a timing diagram illustrating the operation of internal signals and output signals generated by the pulse generator 200. The operation of this circuit will be well known to those skilled in the art and therefore detailed description thereof is not included herein.

When the pulse generator 200 generates the pulse signal PLS, the sawtooth signal generator 110 will output a sawtooth signal $V_{SAW}$ in response to the divisor input signal $V_C$. After the pulse signal PLS goes low, the charge-time control circuit 120 will compare the sawtooth signal $V_{SAW}$ with the first multiplier input signal $V_B$ to produce a charge-time signal $V_{CT}$. The programmable charge time $T_1$ of the charge-time signal $V_{CT}$ will be proportional to the magnitude of the first multiplier input signal $V_B$ divided by the divisor input signal $V_C$. The linear charging circuit 130 will charge a capacitor 131 for the duration of the programmable charge time $T_1$. The capacitor 131 will be charged by a current having an amplitude proportional to the magnitude of the second multiplier input signal $I_A$. At this point, the charge of the capacitor 131 will determine the magnitude of the output voltage signal $V_M$ of the switched charge multiplier-divider 100. When the pulse generator 200 supplies the sampling signal SMP, the output-stage signal $V_{C2}$ of the linear charging circuit 130 will be sampled by the sample-hold circuit 140 to produce the output voltage signal $V_M$ of the multiplier-divider 100. The delay time $t_{D2}$ is inserted between the falling-edge of the sampling signal SMP and the rising-edge of the clear signal CLR to reset the switched charge multiplier-divider 100.

Figure 4:
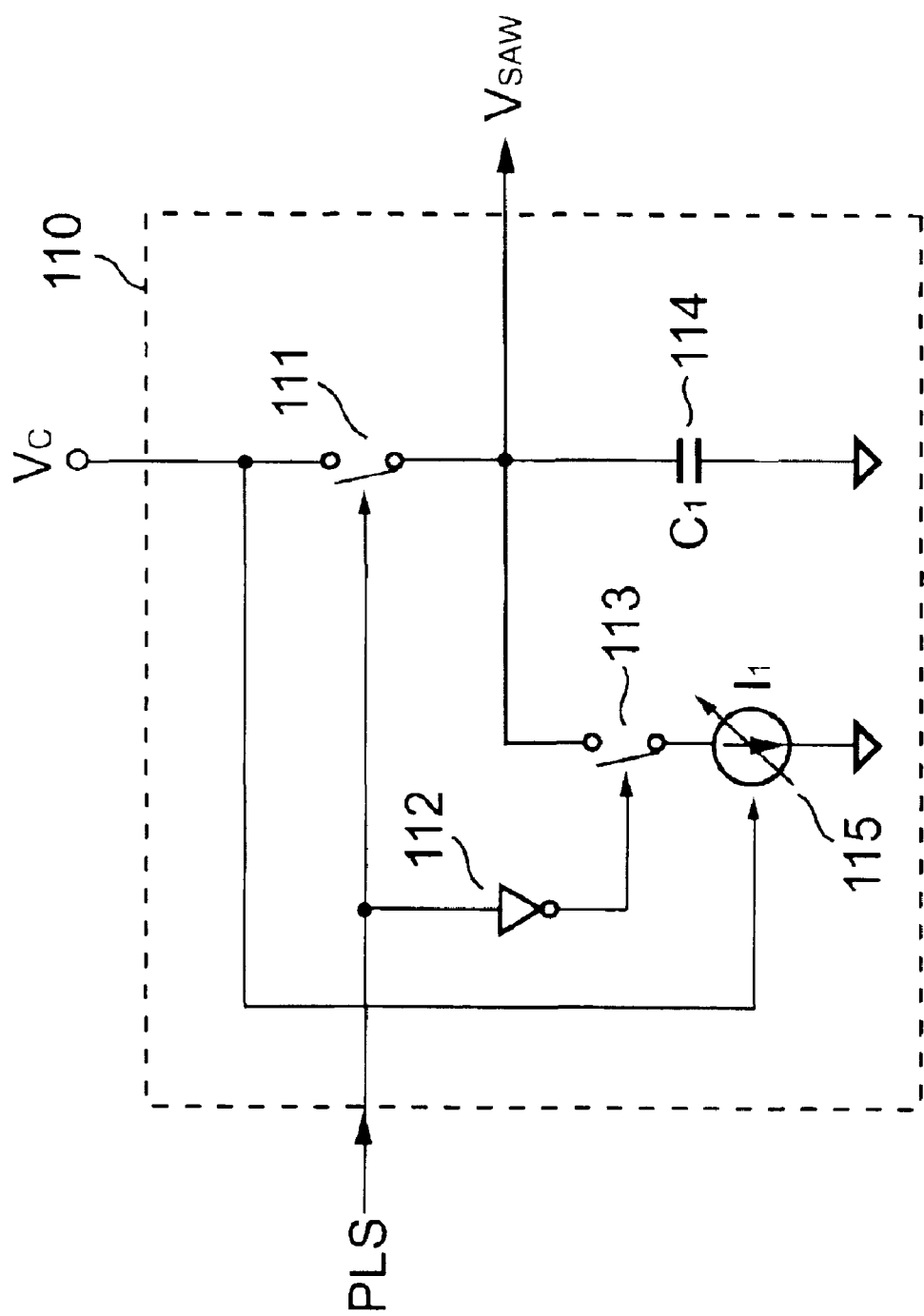
FIG. 4 shows a sawtooth signal generator of the switched charge multiplier-divider according to a preferred embodiment of the present invention.

FIG. 4 shows the sawtooth signal generator 110 according to a preferred embodiment of the present invention. The sawtooth signal generator 110 includes a switch 111, a NOT-gate 112, a switch 113, a capacitor 114 having a capacitance $C_1$, and a dynamic current sink 115. A control terminal of the switch 111 and an input of the NOT-gate 112 are supplied with the pulse signal PLS of the pulse generator 200. An output of the NOT-gate 112 is connected to a control terminal of the switch 113. The switch 111 is supplied with the divisor input signal $V_C$ and is connected to the output terminal of the sawtooth signal generator 110. The capacitor 114 is connected between the output terminal of the sawtooth signal generator 110 and the ground reference. The switch 113 is connected between the output terminal of the sawtooth signal generator 110 and an input of the dynamic current sink 115. An output of the dynamic current sink 115 is connected to the ground reference. A modulated terminal of the dynamic current sink 115 is supplied with the divisor input signal $V_C$.

As the pulse generator 200 supplies a logic-high pulse signal PLS, the switch 111 will close. This will cause the divisor input signal $V_C$ to charge the capacitor 114. When the pulse signal PLS goes low, the switch 111 will open, and the switch 113 will close. At this point, the capacitor 114 will begin to discharge via the dynamic current sink 115. To ensure that the discharge time will be independent of the divisor input signal $V_C$, the dynamic current sink 115 generates a sink current $I_1$, that is proportional to the magnitude of the divisor input signal $V_C$. Therefore the maximum voltage and the slew rate of the sawtooth signal $V_{SAW}$ will be proportional to the magnitude of the divisor input signal $V_C$.

Figure 5:
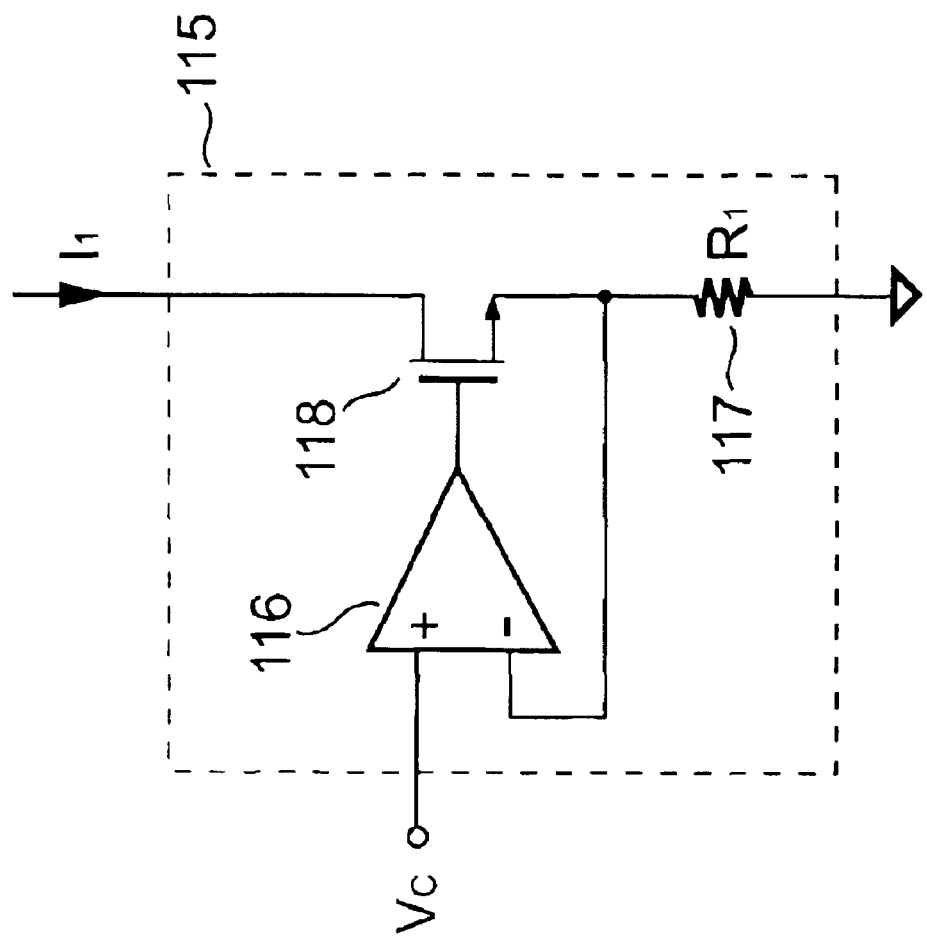
FIG. 5 shows a dynamic current sink of the sawtooth signal generator of the switched charge multiplier-divider according to a preferred embodiment of the present invention.

FIG. 5 shows the dynamic current sink 115 according to a preferred embodiment of the present invention. The dynamic current sink 115 generates the sink current $I_1$ that is proportional to the magnitude of the divisor input signal $V_C$. This is used to regulate the discharge time of the capacitor 114, so that the period length of the sawtooth signal $V_{SAW}$ will be independent of the magnitude of the input signals of the switched charge multiplier-divider 100.

The dynamic current sink 115 includes an operational amplifier 116, a resistor 117 having a resistance $R_1$, and a MOSFET 118. A positive terminal of the operational amplifier 116, which is also the modulated terminal of the dynamic current sink 115, is supplied with the divisor input signal $V_C$. A negative terminal of the operational amplifier 116 is connected to a source of the MOSFET 118. A drain of the MOSFET 118, which is also the input of the dynamic current sink 115, is connected to the output terminal of the switch 113 shown in FIG. 4. A first terminal of the resistor 117 is connected to the source of the MOSFET 118. A second terminal of the resistor 117, which is also the output of the dynamic current sink 115, is connected to the ground reference. An output terminal of the operational amplifier 116 is connected to a gate of the MOSFET 118. The dynamic current sink 115 generates the sink current $I_1$ that is proportional to the magnitude of the divisor input signal $V_C$, divided by the resistance $R_1$ of the resistor 117. Operation of this circuit will be well known to those skilled in the art and therefore a detailed description thereof is not included herein.

Referring to FIG. 3, the output terminal of the sawtooth signal generator 110 supplies the sawtooth signal $V_{SAW}$ to the charge-time control circuit 120. The charge-time control circuit 120 includes a comparator 121, an AND-gate 122, and a NOT-gate 123.

A negative terminal of the comparator 121 is connected to the output terminal of the sawtooth signal generator 110. The first multiplier input signal $V_B$ is supplied to a positive terminal of the comparator 121. An output of the comparator 121 is connected to a first input terminal of the AND-gate 122. A second input terminal of the AND-gate 122 is connected to an output of the NOT-gate 123. The pulse signal generator 200 supplies the pulse signal PLS to an input of the NOT-gate 123. An output of the AND-gate 122 generates the charge-time signal $V_{CT}$ to determine the programmable charge time $T_1$.

The comparator 121 will compare the first multiplier input signal $V_B$ with the sawtooth signal $V_{SAW}$ of the sawtooth signal generator 110. When the pulse signal PLS supplied by the pulse signal generator 200 goes low, the AND-gate 122 will output a charge-time signal $V_{CT}$, in which the on-time of said charge-time signal $V_{CT}$ is proportional to the magnitude of the first multiplier input signal $V_B$.

The charge-time signal $V_{CT}$ is supplied to the linear charging circuit 130. The linear charging circuit 130 includes a capacitor 131 has the capacitance $C_2$, a switch 132, and a switch 133.

An input terminal of the linear charging circuit 130 is supplied with the second multiplier input signal $I_A$ of the switched charge multiplier-divider 100. The switch 132 is connected between the input terminal of the linear charging circuit 130 and an output terminal of the linear charging circuit 130. A control terminal of the switch 132 is connected to the output of the AND-gate 122. A turn-on time $t_{132}$ of the switch 132 will be proportional the product of the resistance $R_1$ of the resistor 117, the capacitance $C_1$ of the capacitor 114, and the magnitude of the first multiplier input signal $V_B$. The turn-on time $t_{132}$ of the switch 132 will be inversely proportional to the magnitude of the divisor input signal $V_C$. The switch 133 is connected between the output terminal of the linear charging circuit 130 and the ground reference. The pulse generator 200 supplies the clear signal CLR to a control terminal of the switch 133. The capacitor 131 is connected between the output terminal of the linear charging circuit 130 and the ground reference.

When the switch 132 is closed by the charge-time signal $V_{CT}$ supplied by the AND-gate 122, the second multiplier input signal $I_A$ of the switched charge multiplier-divider 100 will supply a current to charge the capacitor 131. The amplitude of this current will be proportional to the magnitude of the second multiplier input signal $I_A$. When the pulse generator 200 generates a logic-high clear signal CLR, the switch 133 will close, and the charge stored in the capacitor 131 will be discharged.

The sample-hold circuit 140 includes an operational amplifier 141, a switch 142, and a capacitor 143. A positive input of the operational amplifier 141 is connected to the output terminal of the linear charging circuit 130. A negative input of the operational amplifier 141 is connected to an output of the operational amplifier 141. The switch 142 is connected between the output of the operational amplifier 141 and the output of the switched charge multiplier-divider 100. A control terminal of the switch 142 is controlled by the sampling signal SMP of the pulse generator 200. The capacitor 143 is connected between the output of the switched charge multiplier-divider 100 and the ground reference.

The operational amplifier 141 is a buffer for the charge of the capacitor 131. When a logic-high sampling signal SMP from the pulse generator 200 closes the switch 142, the voltage at the output of the operational amplifier 141 will be equal to the potential of the capacitor 131. The maximum voltage of the capacitor 131 will determine the output voltage signal $V_M$ at the output of the switched charge multiplier-divider 100. Within a constant factor, the magnitude of this output voltage signal $V_M$ will be proportional to the magnitude of the first multiplier input signal $V_B$ multiplied by the magnitude of the second multiplier input signal $I_A$, divided by the magnitude of the divisor input signal $V_C$. The capacitor 143 is included as a holding capacitor to keep the output voltage signal $V_M$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A multiplier-divider circuit comprising:
   a first multiplier input terminal, for receiving a first multiplier input signal;
   a second multiplier input terminal, for receiving a second multiplier input signal;
   a divisor input terminal, for receiving a divisor input signal;
   an output voltage terminal, for generating an output voltage signal;
   a pulse generator, for generating a pulse signal, a sampling signal, and a clear signal;
   a sawtooth signal generator, for generating a sawtooth signal in response to said divisor input signal, wherein the period of said sawtooth signal is fixed, and wherein a maximum voltage and a slew rate of said sawtooth signal are proportional to said divisor input signal;
   a charge-time control circuit, for generating a charge-time signal to produce a programmable charge time, wherein said sawtooth signal is compared with said first multiplier input signal to produce said charge-time signal;
   a linear charging circuit having a charge circuit for generating an output-stage signal, wherein a charge-time of said linear charging circuit is determined by said programmable charge time; and
   a sample-hold circuit, for sampling said output-stage signal and producing said output voltage signal at said output voltage terminal of the multiplier-divider circuit.

2. The multiplier-divider circuit as claimed in claim 1, wherein the magnitude of said output voltage signal of the multiplier-divider circuit is substantially proportional to the product of the magnitude of said first multiplier input signal and the magnitude of said second multiplier input signal.

3. The multiplier-divider circuit as claimed in claim 1, wherein the magnitude of said output voltage signal of the multiplier-divider circuit is inversely proportional to the magnitude of said divisor input signal.

4. The multiplier-divider circuit as claimed in claim 1, wherein said sawtooth signal generator comprises:
   a first sawtooth input terminal, for receiving said pulse signal;
   a second sawtooth input terminal, for receiving said divisor input signal;
   a sawtooth output terminal, for generating said sawtooth signal;
   a sawtooth capacitor, connected between sawtooth output terminal and the ground reference;
   a sawtooth current sink, for discharging said sawtooth capacitor, wherein said sawtooth current sink has an output connected to the ground reference, and wherein said sawtooth current sink has a modulated terminal connected to said second sawtooth input terminal;
   a sawtooth inverter, having an input connected to said first sawtooth input terminal;
   a sawtooth discharge switch, connected between said sawtooth output terminal and an input of said sawtooth current sink, wherein said sawtooth discharge switch has a control terminal connected to an output of said sawtooth inverter; and
   a sawtooth charge switch, connected between said second sawtooth input terminal and said sawtooth output terminal, wherein said sawtooth charge switch has a control terminal connected to said first sawtooth input terminal.

5. The multiplier-divider circuit as claimed in claim 4, wherein said sawtooth current sink comprises:
   a sawtooth transistor, for producing a discharge current;
   a sawtooth amplifier, having an output terminal for controlling said sawtooth transistor, wherein said sawtooth amplifier has a negative input connected to a source of said sawtooth transistor, and wherein said sawtooth amplifier has a positive input connected to said second sawtooth input terminal; and
   a sawtooth resistor connected between said source of said sawtooth transistor and said output of said sawtooth current sink.

6. The multiplier-divider circuit as claimed in claim 4, wherein the discharge time of said sawtooth capacitor is constant while the magnitude of said divisor input signal varies.

7. The multiplier-divider circuit as claimed in claim 4, wherein the peak value of said sawtooth signal is proportional to the magnitude of said divisor input signal.

8. The multiplier-divider circuit as claimed in claim 1, wherein the charge-time control circuit comprises:
   a charge-time comparator, wherein said charge-time comparator has a positive input connected to said first multiplier input terminal and wherein said charge-time comparator has a negative input supplied with said sawtooth signal;
   a pulse inverter, for inverting said pulse signal; and
   an AND-gate, for generating said charge-time signal, wherein said AND-gate has a first input connected to an output of said charge-time comparator, and wherein said AND-gate has a second input connected to an output of said pulse inverter.

9. The multiplier-divider circuit as claimed in claim 1, wherein the period of said programmable charge time is proportional to the magnitude of said first multiplier input signal divided by the magnitude of said divisor input signal.

10. The multiplier-divider circuit as claimed in claim 1, wherein said linear charging circuit comprises:
    a charge capacitor, for generating said output-stage signal, wherein said charge capacitor is connected to the ground reference;
    a charge switch, connected between said second multiplier input terminal and said charge capacitor, wherein said charge switch has a control terminal supplied with said charge-time signal; and
    a discharge switch, connected between said charge capacitor and the ground reference for discharging said charge capacitor, wherein said discharge switch has a control terminal controlled by said clear signal.

11. The multiplier-divider circuit as claimed in claim 1, wherein the state of the multiplier-divider circuit is refreshed in response to said clear signal and said sampling signal.

12. The multiplier-divider circuit as claimed in claim 1, wherein said sample-hold circuit comprises:

a sample-hold amplifier, for buffering said output-stage signal, wherein said sample-hold amplifier has a positive input supplied with said first output-state signal, and wherein said sample-hold amplifier has a negative input connected to an output of said sample-hold amplifier;

a sample-hold switch, for sampling said output-stage signal, wherein said sample-hold switch is connected between said output of said sample-hold amplifier and said output voltage terminal of the multiplier-divider circuit, and wherein said sample-hold switch has a control terminal supplied with said sampling signal; and a sample-hold capacitor for holding said output signal, wherein said sample-hold capacitor is connected between said output voltage terminal of the multiplier-divider circuit and the ground reference.

13. The multiplier-divider circuit as claimed in claim 1, wherein said pulse generator comprises:

a pulse output terminal, for generating said pulse signal;

a sample output terminal, for generating said sampling signal;

a clear output terminal, for generating said clear signal;

a pulse-generator current source, having an input connected to a voltage source;

a pulse-generator current sink, having an output connected to the ground reference;

a pulse-generator junction;

a first pulse-generator switch, connected between an output of said pulse-generator current source and said pulse-generator junction;

a second pulse-generator switch, connected between said pulse-generator junction and an input of said pulse generator current sink; and a control circuit, for controlling said first pulse-generator switch and said second pulse-generator switch.

14. The multiplier-divider circuit as claimed in claim 13, wherein said control circuit comprises:

a hysteresis comparator, wherein said hysteresis comparator has an input connected to said pulse-generator junction;

a pulse-generator capacitor, connected between said input of said hysteresis comparator and the ground reference;

a first array of two NOT-gates, having an input connected to the an output of said hysteresis comparator;

a pulse-generator comparator, having a positive input connected to said sawtooth output terminal of said sawtooth signal generator, wherein said pulse-generator comparator has a negative input connected to a reference voltage terminal;

a second array of two NOT-gates, having an input connected to an output of said pulse-generator comparator;

a latch circuit, composed of a first NAND-gate and a second NAND-gate, wherein said latch circuit has a first input connected to an output of said first array of two NOT-gates, wherein said latch circuit has a second input connected to an output of said second array of two NOT-gates, and wherein said latch circuit has an output for supplying a clock signal to a control terminal of said second pulse-generator switch; and a NOT-gate, for supplying an inverted clock signal to a control terminal of said first pulse-generator switch, wherein said NOT-gate has an input connected to said output of said latch circuit.

15. The multiplier-divider circuit as claimed in claim 13, wherein said control circuit further comprises:

a third array of three NOT-gates, having an input connected to said output of the latch circuit;

a first pulse-generator AND-gate, having an input connected to an output of said third array of three NOT-gates, wherein said first pulse-generator AND-gate has an inverted input connected to said output of said latch circuit, and wherein said first pulse-generator AND-gate has an output connected to said sample output terminal;

a fourth array of three NOT-gates, having an input connected to said first input of said latch circuit;

a second pulse-generator AND-gate, having an input connected to an output of said fourth array of three NOT-gates, wherein said second pulse-generator AND-gate has an inverted input connected to said first input of said latch circuit, and wherein said second pulse generator AND-gate has an output connected to said clear output terminal of said pulse generator; and a third NAND-gate, having a first input connected to said output of said latch circuit, wherein said third NAND-gate has a second input connected to said first input of said latch circuit, and wherein said third NAND-gate has an output connected to said pulse output terminal of said pulse generator.

16. The multiplier-divider circuit according to claim 1, wherein said sampling signal is generated in response to said pulse signal, following a first delay time, wherein said clear signal is generated in response to said sampling signal, following a second delay time.

17. The multiplier-divider circuit according to claim 1, wherein the multiplier-divider circuit is constructed of CMOS MOSFET-based devices.

18. A method of circuit operation in multiplier-divider circuit, comprising:

receiving a first multiplier input signal;

receiving a second multiplier input signal;

receiving a divisor input signal;

generating a pulse signal;

generating a sampling signal that follows to said pulse signal after a first delay time;

generating a clear signal, that follows to said sampling signal after a second delay time;

generating a sawtooth signal in response to said pulse signal, wherein the peak value of said sawtooth signal is proportional to the magnitude of said divisor input signal, and wherein the period of said sawtooth signal is constant;

charging a capacitor for generating an output-stage signal, wherein said capacitor is charged by a current with an amplitude proportional to the magnitude of said second multiplier input signal;

controlling a charge time of said capacitor, wherein said charge time of said capacitor is proportional to the magnitude of said first multiplier input signal, wherein a charge time of said capacitor is inversely proportional to the magnitude of said divisor input signal;

discharging said capacitor for refreshing the state of the multiplier-divier circuit; and sampling and holding said output-stage signal to produce an output voltage signal.

19. The method of circuit operation in the multiplier-divider circuit as claimed in claim 18, wherein the magnitude of said output voltage signal of the multiplier-divider circuit is substantially proportional to the magnitude of said first multiplier input signal multiplied by the magnitude of said second multiplier input signal.

20. The method of circuit operation in the multiplier-divider circuit as claimed in claim 18, wherein the magnitude of said output voltage signal of the multiplier-divider circuit is inversely proportional to the magnitude of said divisor input signal.

* * * * *

UNITED STATES PATENT AND TRADEMARK OFFICE
CERTIFICATE OF CORRECTION

PATENT NO. : 6,812,769 B1
DATED : November 2, 2004
INVENTOR(S) : Ta-Yung Yang et al.

It is certified that error appears in the above-identified patent and that said Letters Patent is hereby corrected as shown below:

<u>Title page</u>,
Item [73], Assignee, change "System Chemical Corp." to -- System General Corp. --

Signed and Sealed this

Fifth Day of April, 2005

JON W. DUDAS
*Director of the United States Patent and Trademark Office*